July 14, 1953
K. C. BUGG
2,645,448
BALANCED VALVE
Filed Sept. 28, 1949
3 Sheets-Sheet 1
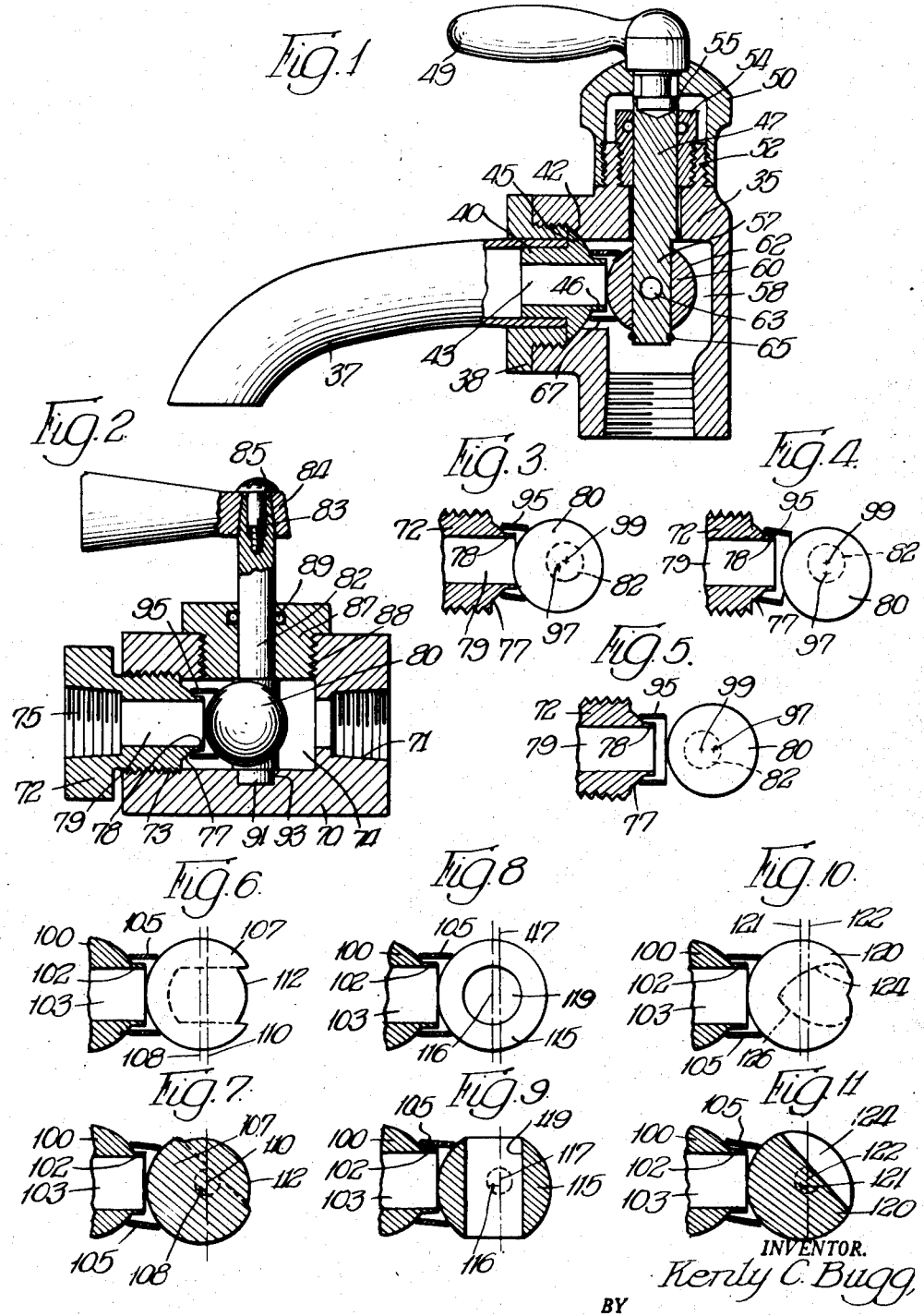
INVENTOR.
Kenly C. Bugg,
BY July 14, 1953  K. C. BUGG  2,645,448
BALANCED VALVE
Filed Sept. 28, 1949  3 Sheets-Sheet 2
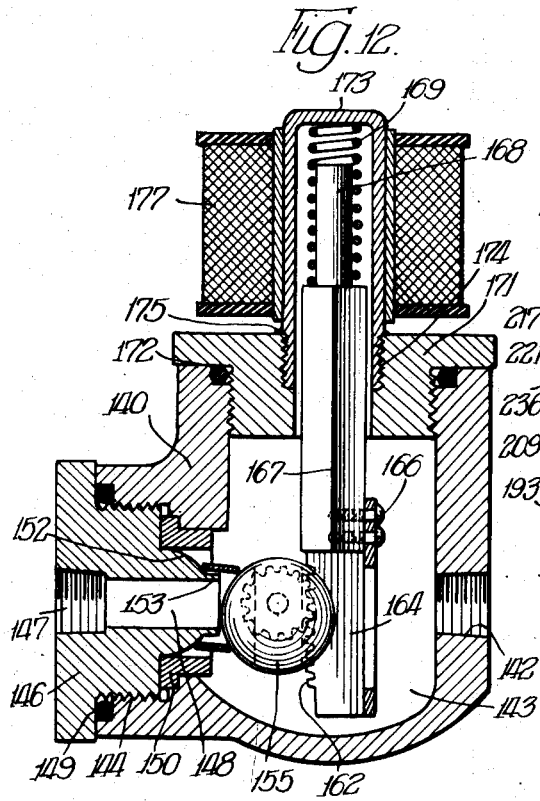
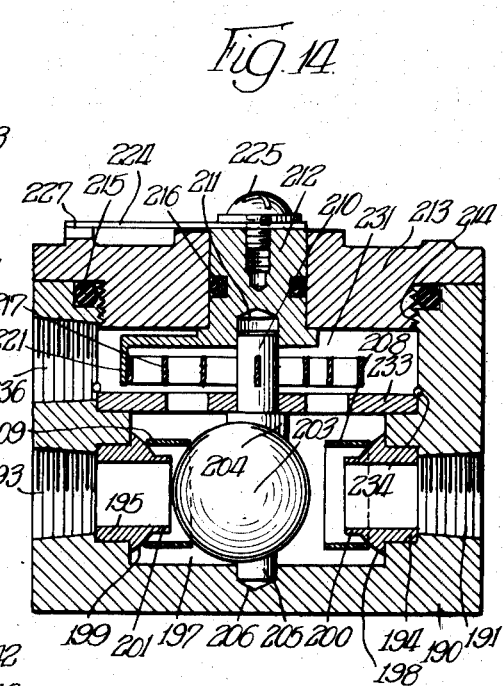
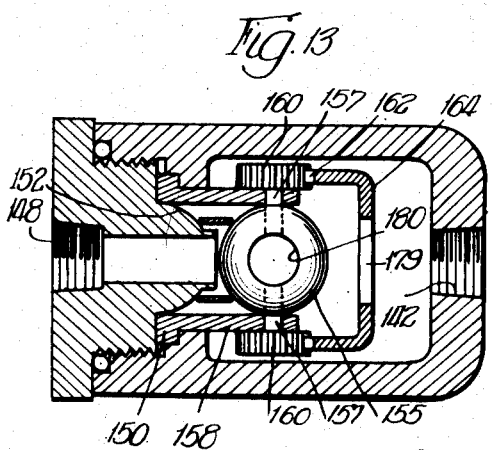
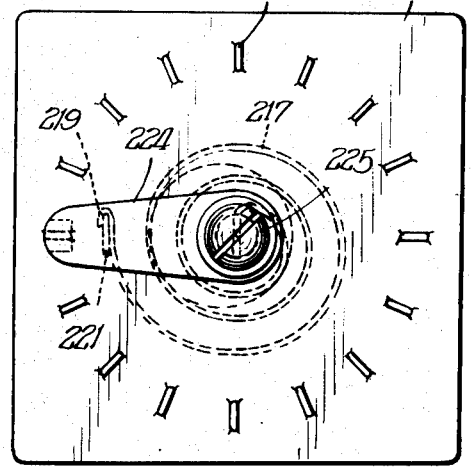
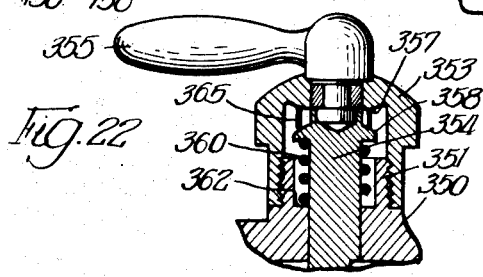
INVENTOR.
Kenly C. Bugg,
BY July 14, 1953 K. C. BUGG 2,645,448
BALANCED VALVE
Filed Sept. 28, 1949 3 Sheets-Sheet 3
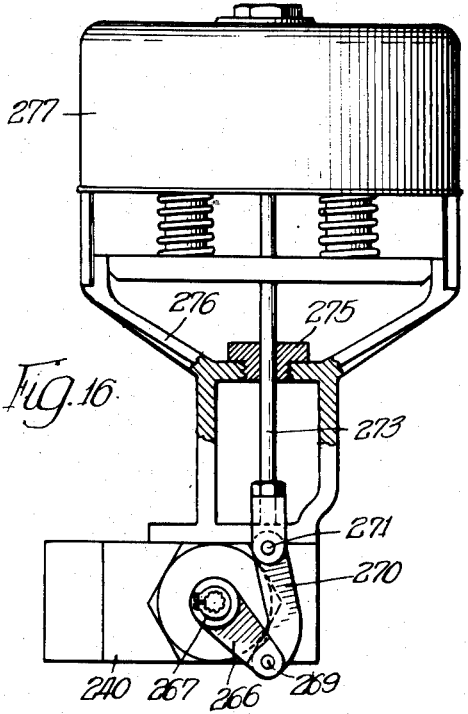
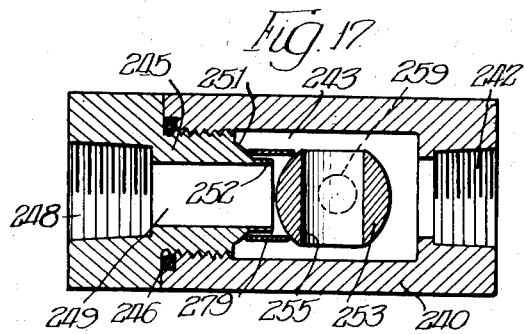
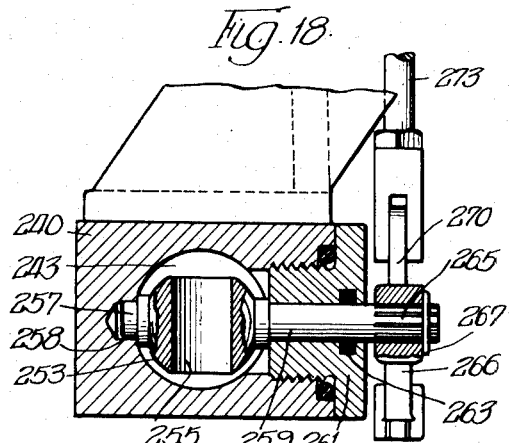
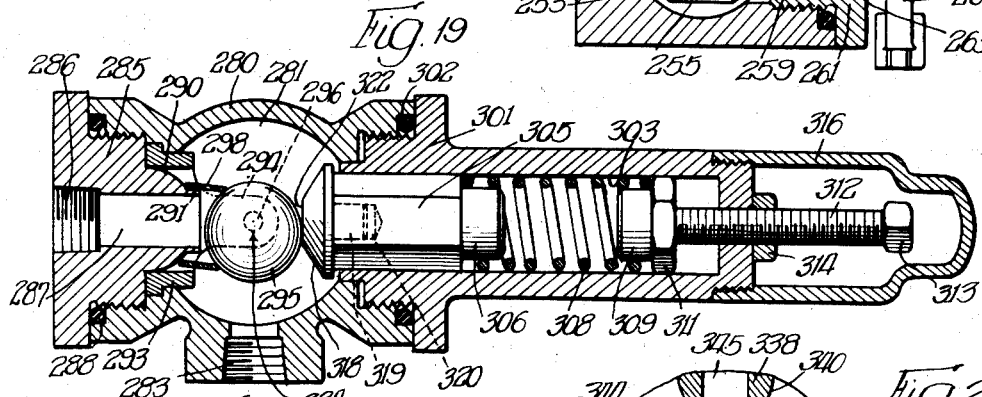
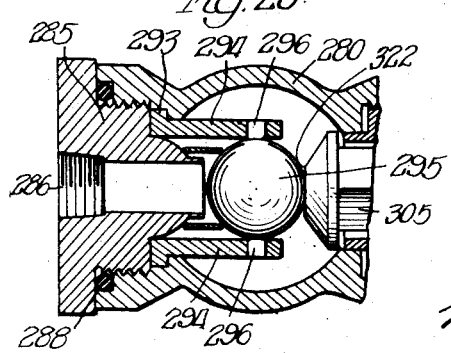
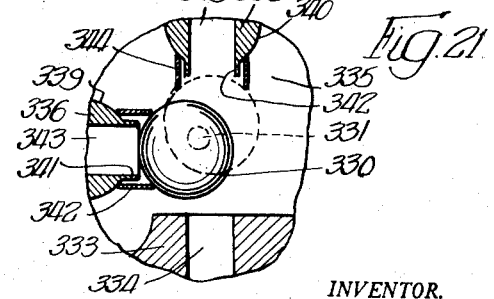
INVENTOR.
Kenly C. Bugg,
BY Wilkinson, Huxley, Byron & Hume
ATTYS.

Patented July 14, 1953

2,645,448

UNITED STATES PATENT OFFICE 2,645,448

BALANCED VALVE

Kenly C. Bugg, Fort Wayne, Ind., assignor to Kendick Manufacturing Company, Inc., Fort Wayne, Ind., a corporation of Indiana Application September 28, 1949, Serial No. 118,426

11 Claims. (Cl. 251—16)

This invention relates to a new and improved valve and more particularly to a rotary valve having a balanced or differential operating action.

This application is a continuation-in-part of my co-pending application Serial No. 72,787, filed January 26, 1949, for Valve and Valve Seal Therefor.

In valve mechanism, it is usual to have a fixed seat and a poppet or movable valve member, together with means for moving the valve member toward and from the valve seat. The flow passage is through the fixed seat, and fluid-tight contact between the valve seat and valve member is essential. Therefore, in many forms of construction expensive machining operations and finishes within very close tolerances are necessary, particularly in valves for high pressure work having metal to metal contacting surfaces. In some constructions plastic inserts are used, but such inserts are deformed in use and require replacement after relatively short use. In usual types of valves having metal to metal contacts, the mating parts may become distorted due to high pressures and temperatures or to fluctuations thereof. Such distortions cause leakage and objectionable wire drawing.

The present valve construction comprises a fixed valve seat which is a section of a sphere and a movable valve member which also provides a spherical surface. The valve comprises a third member in the form of a ring which is arranged to engage both the fixed and movable spherical surfaces and to closely contact them in the closed position of the valve. The movable valve member is pivoted on an axis which is located eccentrically of the center about which the sphere is formed and parallel to a diameter of the sphere passing through the axis. Fluid pressure against the spherical surface is thus unbalanced about the axis of rotation of the sphere and may be designed to assist closing action and maintenance of closed position. Further, the effective lever arm of the pressure against the sphere varies as the sphere rotates about its eccentric axis.

The combination of the valve seat formed with a spherical surface, the movable valve with a spherical surface and the ring which engages both surfaces forms a universal joint which makes possible the use of relatively unyielding metallic surfaces with eccentric movement of the valve. Since this universal joint construction is present, the ring may be relatively stiff and rigid although it may be formed of material which has a certain amount of flexibility and resilience. The parts are preferably so related that the closed position of the valve leaves a possible further movement of the valve sphere about its eccentric axis. Such further movement will take care of wear or deformation of the parts. For example, the parts may be designed so that in a normal closing of the valve the line joining the rotational and spherical axes of the movable member makes an angle of 45° with a line joining the rotational axes and the center of the sphere upon which the fixed valve surfaces are formed. This would permit a further angular movement of 45° to take up future wear or deformation or any possible variation in dimensions. Thus, the necessity for working to very close tolerances is avoided.

The amount of eccentricity controls the effective lever arm available for manual or mechanical operation of the valve and also the lever arm acted upon by the fluid under pressure. This latter lever arm also varies at different valve positions. A further factor available for pressure variation is the relationship between the diameter of the sphere and that of the ring. All these factors may be varied, as desired, to meet differing conditions and requirements.

It is an object of the present invention to provide a new and improved balanced or differential valve of the rotary type.

It is a further object to provide a rotary valve which may be predetermined as to its balanced or differential characteristics.

It is also an object to provide a balanced valve which may be adapted for extreme pressure or temperature conditions and wherein it is not necessary to observe close tolerances.

It is an additional object to provide a balanced or differential valve wherein it is not necessary to provide a plurality of poppets, seats, pistons, guides or the like.

It is another object to provide a balanced or differential valve wherein only single valve and seat elements are provided operable in themselves to obtain the desired conditions of balance as distinguished from valves wherein, for example, one valve and seat combination is used for flow control and other means are used for obtaining the balanced or differential characteristics.

It is an additional object to provide a balanced or differential valve wherein a metallic or other contact is provided which does not use material subject to be affected adversely by temperatures or pressures.

It is a further object to provide a balanced or differential valve wherein closure members are so constructed that the flow and differential characteristics are controlled in a desirable manner.

Another object is to provide a balanced or differential valve wherein different conditions of spring loading of balance members enables high pressure relief valves to be obtained and which utilizes relatively light springs whereby valve size can be reduced and, consequently, cost reduced without sacrificing operative effectiveness.

It is also an object to provide a construction of a balanced or differential valve which operates without chatter or wire drawing.

It is a further object to provide a balanced or differential valve which is selectively biased towards open or closed position at predetermined rates of speed relative to pressure, thus controlling flow therethrough.

It is an additional object to provide a rotatable balanced or differential valve where a thermal control operation may be effectively used.

Other and further objects will appear as the description proceeds.

I have shown certain preferred embodiments of my invention in the accompanying drawings, in which—

Figure 1 is a vertical section taken through one form of the invention applied to a faucet or the like;

Figure 2 is a view generally similar to Figure 1 showing a modified form of the construction where the valve controls linear flow;

Figure 3 is a fragmentary diagrammatic transverse section showing the valve of Figure 2 in closed position;

Figure 4 is a view similar to Figure 3 showing the valve in partly open position;

Figure 5 is a view similar to Figure 3 showing the valve in fully open position;

Figure 6 is a fragmentary elevation showing a modified form of valve closure member;

Figure 7 is a horizontal section through the center of Figure 6;

Figure 8 is a view similar to Figure 6 showing a further modified form;

Figure 9 is a transverse section through Figure 8;

Figure 10 is a view similar to Figure 6 showing a further modification;

Figure 11 is a transverse section through the construction of Figure 10;

Figure 12 is a vertical section through a solenoid-operated form of valve;

Figure 13 is a transverse section taken on line 13—13 of Figure 12;

Figure 14 is a horizontal section through a balanced type of valve controlled by a bi-metallic element;

Figure 15 is a side elevation of the construction of Figure 14;

Figure 16 is a side elevation of a valve actuated by a Sylphon bellows;

Figure 17 is a transverse section taken on line 17—17 of Figure 16;

Figure 18 is a vertical section taken on line 18—18 of Figure 16;

Figure 19 is a transverse section through a balanced type of relief valve;

Figure 20 is a fragmentary section taken on line 20—20 of Figure 19;

Figure 21 is a fragmentary section through a balanced type of two-way valve; and Figure 22 is a fragmentary section showing a form of seal adapted for use with the valve stems or trunnions of the valve constructions shown.

Referring first to the form of construction shown in Figure 1, the valve assembly comprises the valve body 35 to which is secured the spigot spout or outlet 37 held in place by means of the threaded fitting 38. The fitting 38 also secures the seat member 40 between the inner end of the fitting and the complementary surface 42 of the body 35. The member 40 has a cylindrical discharge opening 43 therethrough communicating with the spout 37. This fitting 40 is also provided with a segmental spherical seat 45 and a substantially cylindrical flange 46 extending from the seat about the opening 43.

The valve stem 47 is journaled in the upper portion of the valve housing 35 and is rotatable by means of the handle 49 which may be secured to the valve stem in any desired manner. The cap 50 is threaded onto the outside of the standing flange 52 on the valve body 35, and inner gland member 54 carrying the packing ring 55 is threaded upon the inner face of the flange 52. The lower portion 57 of the valve stem 47 extends within the valve chamber 58 in the valve body 35. This lower section 57 is located eccentrically of the upper body of the valve stem. The movable valve member 60 is provided with a spherical outer surface 62. It is fitted upon the valve stem section 57, the axis of which section coincides with the axis of the sphere 60. The sphere 60 may be firmly secured on the reduced end portion 57, as by push fit, so that it does not rotate relative to the valve stem. A through passage 63 is shown through both the valve stem 57 and the opposite portions of the sphere 60. If desired, this passage 63 may be omitted and, in such case, the sphere 60 may be fitted loosely on the eccentric valve stem portion 57. The loosely fitted ball would be free to rotate on the valve stem and also have a limited free vertical movement. It would thus automatically adjust itself to proper contact with the ring or sleeve 67 and would present different portions of the sphere against the edge of the ring. This prevents any localized wear upon the valve sphere 60. A snap ring 65 is shown on the valve stem portion 57 below the sphere 60 to limit downward movement of the sphere.

The sleeve or ring 67 may be resilient and flexible and is fitted about the flange 46 of the fitting 40, having one circular edge of the ring in contact with the spherical surface 45 of the fitting. The opposite circular edge surface of the ring 67 is in contact with the surface of the sphere 60. It will be noted that, when the valve stem 47 is rotated 90°, the through passage 63 extending through the sphere 60 and the valve stem section 57 will be aligned with the passage 43 through the fitting 42.

The form of construction shown in Figures 2 to 5 inclusive is generally similar in operating characteristics to the form of construction shown in Figure 1. This latter construction, however, is adapted for high pressure work, while the construction of Figure 1 is not adapted for use in connection with such high pressures.

In the construction of Figures 2 to 5, the heavy valve body 70 has the threaded inlet opening 71 and a fitting 72 threaded into the opposite end of the member 70 at 73. This fitting 72 has a threaded internal opening 75, generally similar to the inlet opening 71, so that the fitting may be readily inserted in a continuous flow line. The fitting 75 has an inner face 77 formed as a segment of a sphere, this face terminating in the cylindrical flange 78 which surrounds the passage 79 through the fitting.

The spherical valve member 80 is eccentrically mounted on the rotatable valve stem 82. The top of this valve stem is knurled at 83 to receive a valve operating handle 84 which is held firmly down upon the knurled surface by the screw 85. The heavy gland member 87 is threaded into the upper face of the valve body 70 at 88 and carries the internal packing ring 89. The lower end 91 of the valve stem 82 is seated in a socket 93 formed in the valve body 70. The spherical valve member 80 is thus supported firmly both above and below the axis of rotation. The resilient flexible sleeve or ring 95 is fitted about the flange 78, one edge of the ring resting against the spherical surface 77 of the fitting 72, while the opposite edge of the ring engages the surface of the spherical valve member 80.

The several positions of the valve are shown in Figures 3, 4 and 5. While these figures relate particularly to the valve construction shown in Figure 2, it will be understood that they also substantially apply to the construction shown in Figure 1.

As shown in Figure 3, the vertical axis 97 of the spherical valve member 80 is located between the vertical axis 99 of the valve stem 82 and the fitting 72. This brings the spherical member 80 to its full limit of movement towards the fitting and the ring 95 is firmly held between the spherical surface 77 and the surface of the sphere 80. It will be understood that the valve chamber 74 in the valve body 70 is normally filled with the fluid under pressure from the inlet opening 71 so that the pressure will be exerted upon the outer face of the flexible resilient ring 95.

In Figure 4, the axis 97 of the sphere 80 is moved to a position at right angles to the line extending between the axis 99 of the valve stem 82 and the axis of the fitting 72. Thus, the spherical surface of the member 80 is swung clear of the edge of the flexible ring 95 and clearance is provided for the flow of fluid through the ring and through the internal passage 79 in the fitting 72.

In the operative position shown in Figure 5, the valve is wide open with the axis 97 of the sphere 80 diametrically opposite the opening 79 in fitting 72, which brings the surface of the sphere 80 at its maximum possible distance away from flexible ring 95 and the flange 78. It will be understood that the distances and clearances have been somewhat exaggerated in these Figures 3, 4 and 5 and that the parts are so positioned and related in size that the flexible ring 95 cannot slip clear of the fitting flange 78 and the spherical surface of the movable valve member 80.

Figures 6 to 11 inclusive show modified forms of spherical valves which may be substituted, for example, in place of the spherical valves of Figures 1 and 2.

Figure 6 shows the outlet fitting 100 having spherical surface 101 and the cylindrical flange 102 surrounding the outlet passage 103. The flexible and resilient cylindrical sleeve 105 bears against the spherical surface 101 and against the surface of the valve sphere 107.

Figure 7 is a section taken on lines 7—7 of Figure 6 and the axis of the sphere is indicated in both figures at 108. It is to be noted that this spherical axis 108 is offset from the axis 110, which is that of the stem for rotating the sphere. The somewhat diagrammatic showings of Figures 6 to 11 do not include the operating stem for the sphere, but it will be understood that the sphere may be operated by a single valve stem, as shown in Figure 1, or by a valve stem having a portion located on each side of the sphere so as to fully support it, as shown in Figure 2. The surface of the sphere is shown as partially cut away at 112. It is to be noted, from Figure 6, that this cut away portion does not extend to the full height of the sphere, but is of an extent substantially equal to the diameter of the outlet passage 103.

The axis of the sphere is offset, as shown in Figure 7, from the axis of rotation of the valve stem and the width of the ring 105 is so proportioned relative to the spacing between the sphere 107 and the fitting 100 that, with the parts in full contact as shown in Figure 7, the axis 108 of the sphere is not brought exactly in line with the axis of the fitting 100. This allows for a tight fit in closing the valve. In opening the valve, the valve stem is rotated in the counter-clockwise direction, as seen in Figure 7. The initial part of this rotation moves the spherical surface slightly out of contact with the edge of the ring 105. A notably slight angular movement brings the cut away portion 112 of the sphere in line with the interior of the ring 105, and a slight additional movement brings it in line with the passage 103 so that increased area is provided for the passage of fluid.

The form of construction shown in Figures 8 and 9 involves a sphere 115 having an axis 116 offset from the axis 117 of the operating valve stem. This sphere 115 is provided with a central cylindrical opening 119 passing through the central diameter of the sphere at right angles to the axis 116. The sphere is shown in relation to a fitting 100 and ring 105 identical to those shown in Figures 6 and 7. In this case, it will be apparent that, as the sphere 115 is rotated about the stem axis 117 in the counter-clockwise direction as shown in Figure 9, the sphere will move away from the fitting 100 and ring 105 and, after a movement of 90°, the cylindrical passage 119 will be in full alignment with the passage 103 in the fitting 100.

The form of construction shown in Figures 10 and 11 includes the sphere 120 having the axis 121 and being rotatable about the axis 122 of the operating valve stem. This sphere is also shown in combination with the fixed fitting 100 and the ring 105. The sphere 120 is shown cut away in an approximate heart-shaped configuration at 124. This particular configuration affords a gradual increase in the passage opening available for passage of fluid through the valve with the sphere 120 rotated in a counter-clockwise direction about the valve stem axis 122, as shown in Figure 11. The sphere first moves slightly away from the fitting 100 and ring 105 and then, as rotation continues, the cut away portion 124 is gradually exposed to the interior of ring 105 and central passage 103 through the fitting. Since this area, as shown in broken lines in Figure 10, is quite small at the point 126 which first passes the ring 105 and grows progressively larger, the area available for flow will be gradually increased and not rather quickly increased as would be the case, for example, with the form of construction shown in Figures 6 and 7. It will be apparent, of course, that, conversely, when the valve is closed the cut off of flow will be graduated in the reverse direction.

The form of construction shown in Figure 12 includes a housing 140 having a threaded inlet opening 142 into the valve chamber 143. The opposite side of the housing 140 is provided with a larger threaded opening 144, into which is threaded the fitting 146. This fitting has the threaded opening 147 leading to the cylindrical bore 148. The fitting 146 is shown as compressing a packing ring, such as an O-ring, and also engaging a shouldered valve support member 150. The inner face of the fitting 146 is provided with a spherical contact surface 152 terminating in a cylindrical flange 153 surrounding the passage 148. The spherical valve closure member 155 is pivoted on pivot members 157 which fit into openings in arms 158 extending from member 150. The pivot members 157 are secured to the spherical member 155, as by a tight push fit, so that they rotate with that member. These members 157 are provided with the small gears 160 which mesh with racks 162 formed on the legs of the U-shaped member 164.

The U-shaped member 164 is secured by screws 166 to the lower squared portion 167 of a solenoid plunger. The upper rounded portion 168 of this plunger is surrounded by a compression spring 169. The upper side of the valve chamber 143 is closed by the threaded fitting 171 which compresses the O-ring 172. The cap 173 is threaded into the fitting 171 at 174. A welded joint has also been indicated at 175 since this can be a permanent connection and may, thus, be made fluid-tight. The solenoid coil 177 surrounds the cap 173 of the plunger member 168. It will be noted that the U-shaped member 164 is provided with an enlarged opening 179 in alignment with the inlet port 142 and outlet passage 148, as well as with the passage 180 which extends through the sphere 155.

The form of construction shown in Figures 14 and 15 is adapted for use as a mixing valve which might, for example, be used to mix hot and cold water to deliver a flow of the desired temperature. The body member 190 is provided with the oppositely located inlet openings 191 and 193, which are shown as threaded for the attachment of suitable pipes. The similar fittings 194 and 195 are pressed into the inner portion of these openings and extend into the mixing chamber 197. These fittings 194 and 195 are provided with the spherical surfaces 198 and 199 and the cylindrical flanges 200 and 201 respectively. The spherical valve member 203 is eccentrically mounted on the rotatable valve stem 204. This valve stem has a lower portion 205 fitted in the bearing notch 206 in the body member 190. The flexible and resilient rings 208 and 209 are fitted between the fittings 194 and 195 and the spherical valve 203. The upper end 210 of the valve shaft 204 is fitted in a recess 211 in a rotatable member 212, which member is fitted in the closure member 213. The closure member 213 is threaded into the body member 190 at 214 and presses the packing ring 215. The bearing member 212 is also provided with a packing ring 216, and this member 212 is rotatable in the closure member 213. The bimetallic spiral strip 217 has one end secured to the valve stem 210 and the other end secured, as shown in broken lines in Figure 15, at 219 to the arm 221 which is connected to the member 212. The rotating member 224 is secured to member 212 by means of screw 225, this member 224 having an inwardly extending lug 227 adapted to fit between raised lugs 229 on the face of the closure member 213 to maintain the bi-metallic spiral 217 in the desired position of adjustment.

The mixing chamber 197 in the housing 190 is separated from the outlet chamber 231 by the perforated plate 233 which is held in position by split ring 234. The threaded outlet or discharge opening 236 extends from the chamber 231 through the side wall of the body 190.

In the operation of this valve, the position of the sphere 203 relative to the two rings 208 and 209 is varied, dependent upon the temperature, which affects the spiral 217 and the adjustment of that spiral by means of the arm 224. It would be assumed that if cold water, for example, enters the chamber 197 through opening 191 and hot water enters the same chamber through opening 193, these two flows will mix in the chamber and pass through openings in plate 233 in the chamber 231 where the mixture will act upon the bi-metallic strip 217 and flow out of the housing through the outlet 236. It will be apparent that, by suitable design of the bi-metallic strip 217 and proper adjustment of the normal tension on that spiral by the arm 224, the location of the sphere 203 may be automatically controlled to maintain any desired discharge temperature. This will, of course, be dependent upon the relative temperatures of the incoming hot and cold water and, consequently, the means for adjustment as shown is provided. It is to be noted that this valve is a mixing valve and not a shut off valve. It will be necessary, therefore, to provide suitable valves for closing off flow to inlet passages 191, 193 in the housing 190, or flow from the outlet passage 236 in said housing.

Referring next to the form of construction shown in Figures 16 to 18 inclusive, the device comprises the valve body member 240 having the threaded inlet opening 242 formed therein.

The valve chamber 243 in the body is closed by the fitting 245 which is threaded into the body, compressing the packing ring 246. This fitting 245 has a threaded opening 248 for receiving the end of an outlet pipe, this opening communicating with the central passage 249. The inner face of the fitting 245 is formed with the segmental spherical surface 251 terminating in the cylindrical wall 252 surrounding the passage 249. The rotatable valve member 253 is generally spherical in form with the central passage 255 extending therethrough. As best shown in Figure 18, this member 253 is provided with a trunnion 257 fitting in a bearing socket 258 in the valve body 240. The member 243 is also provided with the shaft 259 aligned with the trunnion 257, both being located eccentrically of the center of the sphere 253, as best shown in Figure 17. The shaft 259 extends through the cap 261 which is threaded into the valve body 240. Packing rings 262 and 263 are provided to make a relatively fluid-tight joint.

The outer end of shaft 259 is knurled or ridged, as indicated at 265, to receive an actuating arm 266 which is held in place by a split ring 267. The outer end of arm 266 is pivoted at 269 to the link 270, the other end of this link being pivoted at 271 to the slide rod 273. This rod 273 is guided in the bearing member 275 threaded in a frame 276. The upper end of this frame 276 carries a mechanism, generally indicated at 277, which serves to impart a linear movement to the rod 273. This mechanism may comprise any usual type of Sylphon or similar bellows responsive to variations in temperature or pressure. This mechanism may then be adjusted as desired to control the opening and closing of the valve upon predetermined variations in temperature or pressure, as the case may be.

The flexible ring 279 is fitted about the cylindrical flange 252, as shown in Figure 17, the edges of the ring engaging the spherical surface 251 of fitting 245 and the spherical surface of the rotatable valve member 253. It will be apparent that, due to the eccentric location of the trunnions about which the sphere 253 rotates, rotation in the counter-clockwise direction, as seen in Figure 17, will open the valve.

The form of construction shown in Figures 19 and 20 relates to a relief valve and differs from the valves previously described in operation because of the necessary characteristics of such a relief valve. The valve housing 280 contains a valve chamber 281 into which leads a discharge passage 283. Into the left end of the valve body 280, as seen in Figure 19, is threaded the fitting 285 having an inlet opening 286 and fluid passage 287 formed therein. The packing ring 288 is provided to form a tight connection. The inner face of the fitting 285 is provided with a spherical contact surface 290 which terminates in the cylindrical flange 291 surrounding the fluid passage 287. The fitting 285 engages the outer face of a valve support frame 293 and retains that frame in position. This frame 293 is provided with a pair of spaced arms 294 between which is fitted the spherical valve member 295. This valve member is provided with the opposite trunnions 296 which fit in openings in the arms 294. It will be noted, from Figure 19, that the trunnions are located eccentrically of the diametrical axis of the sphere 295. The resilient ring 298 fits about the flange 291, its opposite edges engaging the spherical surface 290 and the surface of the sphere 295. The right end of the valve housing 280 is threaded to receive a fitting 301 which compresses a packing ring. This fitting 301 has a central bore 303, the axis of which is aligned with the axis of the inlet passage 287. The hexagonal spring pressed plunger 305 is fitted into bore 303, this plunger having a reduced end 306 about which is fitted one end of the compression spring 308. The opposite end of the spring 308 fits about a reduced portion 309 of an adjustable pressure member 311. The member 311 is adjusted to provide the desired spring pressure by means of a member 312 which is threaded into the end of the fitting 301 and which may be adjusted by its squared end 313. A lock nut 314 is provided to lock the member 312 in the desired adjusted position. The adjusting member is covered by a cap 316 threaded onto the body of the fitting 301.

The slidable plunger 305 has the contact head 318 fitted on its inner and central projection 319 on the head fitting into an axial bore 320 in the member 305. This contact member 318 extends into the valve chamber 281 and has a flattened surface 322 engaging the spherical surface of the valve member 295.

In the operation of this valve, it will be noted that the spherical valve member 295 is supported on trunnions aligned with the axis of the inlet passage 287 and the axis of the plunger 305. These trunnions, as previously stated, however, do not coincide with the axis of the sphere itself which is located at a point 324 indicated on Figure 19. Consequently, the pressure of the fluid engaging the portion of the spherical face surrounded by ring 298 affords a resultant pressure located eccentrically of the axis of the trunnions and one which tends to rotate the sphere about the trunnions in a counter-clockwise direction, as seen in Figure 19. This rotation is resisted by the spring 308, and the valve may be adjusted to open at any desired fluid pressure transmitted to the valve 295 through the passage 287. It will be apparent that, upon reduction in pressure, the valve will be immediately closed by the contact member 318 moving to the left to swing the sphere in the clockwise direction about its trunnions until it fully engages the ring 298. This construction differs from those of the other valves shown in that, in this case, the fluid under pressure engages the inner face of the ring 298 rather than the outer face, as in the other constructions.

Figure 21 is a diagrammatic representation of a two-way valve operating according to the principles of the valve construction disclosed herein. The spherical valve member 330 is pivoted on an eccentric axis at 331. The valve housing 333 is provided with a fluid inlet passage 334 communicating with a valve chamber 335. A pair of similar fittings 336 and 338 are shown extending into the valve chamber 335. The fittings 336 and 338 are provided with the spherical surfaces 339 and 340, respectively, together with the terminating cylindrical flanges 341 and 342, respectively. The fitting 336 is shown as supporting the flexible ring 342, which also is shown engaging the surface of the valve sphere 330. A similar ring 344 is shown as supported on the fitting 338. It will be apparent that, in the valve position shown in Figure 21, the passage 343 through the fitting 336 is closed by the valve member 330, while the passage 345 through fitting 338 is opened to the valve chamber 335 and, consequently, to the inlet passage 334. Rotation of the valve sphere about its trunnions 331 in the counter-clockwise direction to bring it to the broken line position will open the passage 343 and close passage 345. It will be apparent that, at an intermediate position of valve sphere 330, both passages 343 and 345 will be in communication with the valve chamber 335.

The type of seal shown in Figure 22 is applied in the drawing to the general valve construction of Figure 1, but it will be understood that it may be applied equally well to such valve stems or trunnions of other forms of construction as extend externally of the valve body or housing and require a seal. The valve body 350 has the upstanding threaded flange 351 upon which is screwed the cap 352. The rotatable valve stem 354 extends down through the cap 352 and into the valve body 350, the stem being rotated by the handle 355 which is connected thereto in any usual manner. The valve cap 352 is provided on its inner face with the spherical surface 357 surrounding the opening through which the valve stem 354 passes. The valve stem 354 has a circumferentially extending flange 358, the upper face of which is formed as a spherical surface facing the valve cap surface 357. The ring 365 floats between the two spherical surfaces and acts as a seal. The ring is held in close contact with the spherical surfaces by the spring 368, the lower end of which bears against the bottom of the recess 362 in the valve body 350 and its upper end bears against the under side of the valve stem flange 358. Since the various types of valves shown all are in effect universal joints, it is unnecessary that the ring 358 or its meeting spherical surfaces be manufactured to close tolerances since variation of the axial position of the valve stem or trunnion 354 over a substantial distance has no effect on the functioning of the valve.

The operation of the various forms of the valves described will be obvious from the description and drawings of each. The combination of the fixed spherical surface, together with the ring and movable or rotatable spherical surface, constitutes in effect a universal joint so that an absolutely tight closure may be afforded between the spherical surface and ring edges throughout a comparatively wide variation of angular relationships between the fixed and movable members. This avoids the necessity for working to close tolerances and affords the possibility of ample movement to take care of future wear.

It is to be understood that the various forms of the construction shown are illustrative only, as the invention may be further modified to meet differing conditions and requirements. I, therefore, contemplate such variations as come within the spirit and scope of the appended claims.

I claim:

1. In combination a valve comprising a fixed and a rotatable valve member, each of said members having a segmental spherical seat portion, the rotatable member being provided with means whereby it is positively rotatable about an axis eccentric relative to the center of its spherical surface whereby it is moved toward and away from the fixed member and a ring member of less diameter than the diameter of either spherical seat, said ring member being located between the fixed and movable members and having opposite edges adapted to engage the spherical seats of said members and to closely fit against said seats when the rotatable member is rotated to a predetermined position.

2. In combination a valve comprising a fixed and a rotatable valve member, each of said members having a segmental spherical seat portion, the fixed valve member having a fluid passage formed therein extending through the spherical seat portion thereof, the rotatable member being provided with means whereby it is positively rotatable about an axis eccentric relative to the center of its spherical surface whereby it is moved toward and away from the fixed member and a ring member of less diameter than the diameter of either spherical seat, said ring member being located between the fixed and movable members and having opposite edges adapted to engage the spherical seats of said members and to closely fit against said seats when the rotatable member is rotated to a predetermined position, the ring enclosing the passage through the fixed member in said position.

3. In combination a valve comprising a fixed and a rotatable valve member, each of said members having a segmental spherical seat portion, each member having passages extending through said spherical surface, the rotatable member being provided with means whereby it is positively rotatable about an axis eccentric relative to the center of its spherical surface whereby it is moved toward and away from the fixed member, and a ring member of less internal diameter than the diameter of either spherical seat, said ring member being located between the fixed and rotatable members and having opposite edges adapted to engage the spherical seats and to closely fit against said seats when the rotatable member is rotated to a predetermined position, the ring being of a width to stop movement of the rotatable member in one direction at said predetermined position.

4. In combination a valve comprising a fixed and a rotatable valve member, each of said members having a segmental spherical seat portion, each member having passages extending through said spherical surface, the rotatable member being provided with means whereby it is positively rotatable about an axis eccentric relative to the center of its spherical surface whereby it is moved toward and away from the fixed member, and a ring member of less internal diameter than the diameter of either spherical seat, said ring member being located between the fixed and rotatable members and having opposite edges adapted to engage the spherical seats and to closely fit against said seats when the rotatable member is rotated to a predetermined position, the passage through the fixed member being enclosed by said ring in the predetermined position and the passage through the rotatable member being clear of the ring in said position.

5. In combination a valve comprising a fixed and a rotatable valve member, each of said members having a segmental spherical seat portion, each member having passages extending through said spherical surface, the rotatable member being provided with means whereby it is positively rotatable about an axis eccentric relative to the center of its spherical surface whereby it is moved toward and away from the fixed member, and a ring member of less internal diameter than the diameter of either spherical seat, said ring member being located between the fixed and rotatable members and having opposite edges adapted to engage the spherical seats and to closely fit against said seats when the rotatable member is rotated to a predetermined position, the passage through the fixed member being enclosed by said ring in the predetermined position and the passage through the rotatable member being clear of the ring in said position, the rotatable member being movable to a position with the passage through said movable member substantially aligned with the passage in the fixed member and with the ring loosely floating upon the spherical surfaces of the two members.

6. In combination a valve comprising a pair of valve members, each of said members having a segmental spherical seat portion, one of said members being fixed and the other being rotatable, the rotatable member having aligned trunnions extending therefrom upon an axis spaced from the axis of the spherical surface of said member, a ring member fitted between said spherical surfaces and means connected to at least one of said trunnions for rotating the rotatable member toward and away from the ring and fixed member.

7. The valve of claim 1 in which the movable member is provided with a portion of its surface of less radius than the radius of its spherical seat, a portion of the said surface of less radius being exposed within the ring as said member is moved away from the predetermined position.

8. The valve of claim 1 in which the means whereby the rotatable member is positively rotated comprises a member directly contacting the movable member for moving said member toward the ring and fixed member.

9. The valve of claim 1 in which the fixed member has a passage therein extending through the spherical seat, and the seat further has a cylindrical flange extending from the seat around the passage, the ring member fitting loosely about the cylindrical flange.

10. The valve of claim 1 in which the means whereby the rotatable member is positively rotated about an axis eccentric relative to the center of its spherical surface comprises a stem passing through its spherical axis and means supporting said stem to move said stem about an axis located eccentrically of the spherical axis.

11. The valve of claim 1 in which there is provided a second fixed member having a spherical seat portion located adjacent the movable member at a point angularly displaced from the first fixed member, a second ring member of less diameter than the diameter of the spherical seats, said ring being located between the second fixed member and the movable member and having opposite edges adapted to engage the spherical seats of said members and to closely fit against said seats when the rotatable member is rotated to a second predetermined position.

KENLY C. BUGG.

References Cited in the file of this patent

UNITED STATES PATENTS

| Number | Name | Date |
|--------|------|------|
| 218,739 | Hess | Aug. 19, 1879 |
| 1,062,064 | Ward | May 20, 1913 |
| 1,246,747 | Ide | Nov. 13, 1917 |
| 1,442,452 | Taylor | Jan. 16, 1923 |
| 1,670,691 | Riggin | May 22, 1928 |
| 1,784,381 | O'Stroke | Dec. 9, 1930 |
| 2,080,272 | Hollman | May 11, 1937 |
| 2,142,970 | Anderson | Jan. 3, 1939 |
| 2,173,949 | Neveu | Sept. 26, 1939 |
| 2,479,544 | Bugg | Aug. 23, 1949 |

FOREIGN PATENTS

| Number | Country | Date |
|--------|---------|------|
| 444,516 | Great Britain | Mar. 23, 1936 |